United States Patent [19]

Abrams

[11] 4,012,827

[45] Mar. 22, 1977

[54] METHOD FOR MOLDING COMPOSITE ARTICLES

[76] Inventor: Gilbert Lawrence Abrams, 113 Helene Road, Valley Cottage, N.Y. 10989

[22] Filed: June 9, 1975

[21] Appl. No.: 584,828

[52] U.S. Cl. .............................. 29/453; 425/242 R; 425/317; 425/441; 425/249; 249/68
[51] Int. Cl.² .......................................... B29F 1/14
[58] Field of Search ............... 425/351, 438, 242 R, 425/317, 351, 438, 441, 444; 249/68; 25/42 D X; 29/453

[56] References Cited
UNITED STATES PATENTS

| | | | |
|---|---|---|---|
| 3,013,308 | 12/1961 | Armour | 425/242 R X |
| 3,477,095 | 11/1969 | Lensky | 249/68 X |

*Primary Examiner*—J. Howard Flint, Jr.
*Attorney, Agent, or Firm*—Louis A. Tirelli

[57] ABSTRACT

A molding apparatus to provide composite plastic articles within the mold is provided. The apparatus includes upper and lower sections which when in a closed position, form a mold cavity divided into two separated chambers by partitions in the upper section. Elements of a desired configuration are formed in the chambers by injecting molten plastic therein and cooling. After formation of the elements, the upper section of the mold is removed and with it, the partitions separating the cavity into chambers. The elements, which are now at opposite ends of an unblocked cavity, are then driven into engagement with each other by a driving means while still in the mold. The joined elements are then ejected from the mold as a composite article. In the preferred embodiment, the elements are interlocked "E" shaped devices which form a solid cube when joined. These elements are molded with protrusions placed on the surfaces thereof and when coated with a plastic coating, the cube forms a game die with the protrusions functioning as the "numbers" thereon.

7 Claims, 8 Drawing Figures

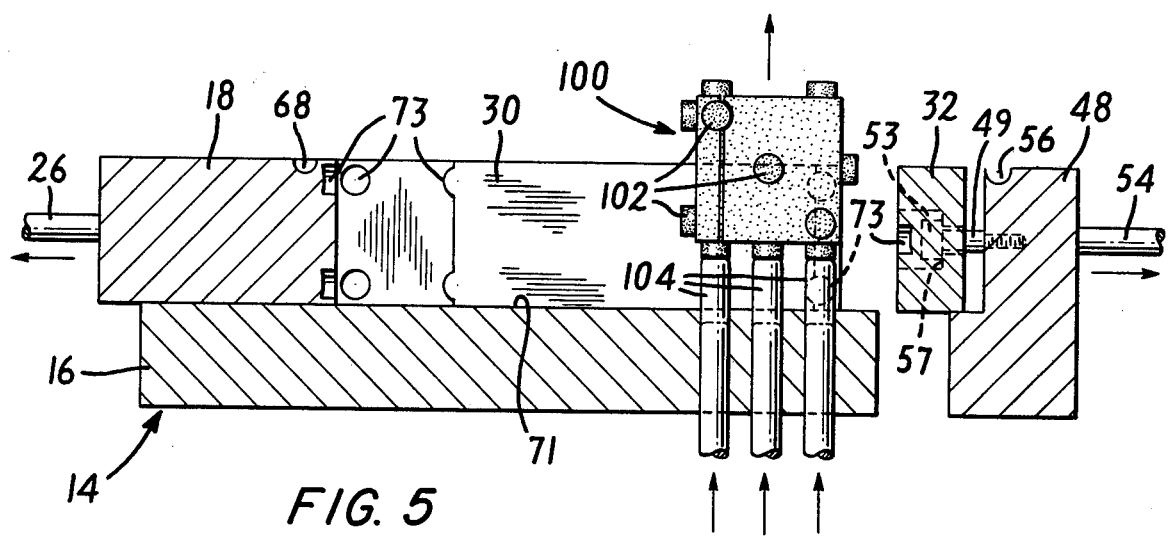
FIG. 5
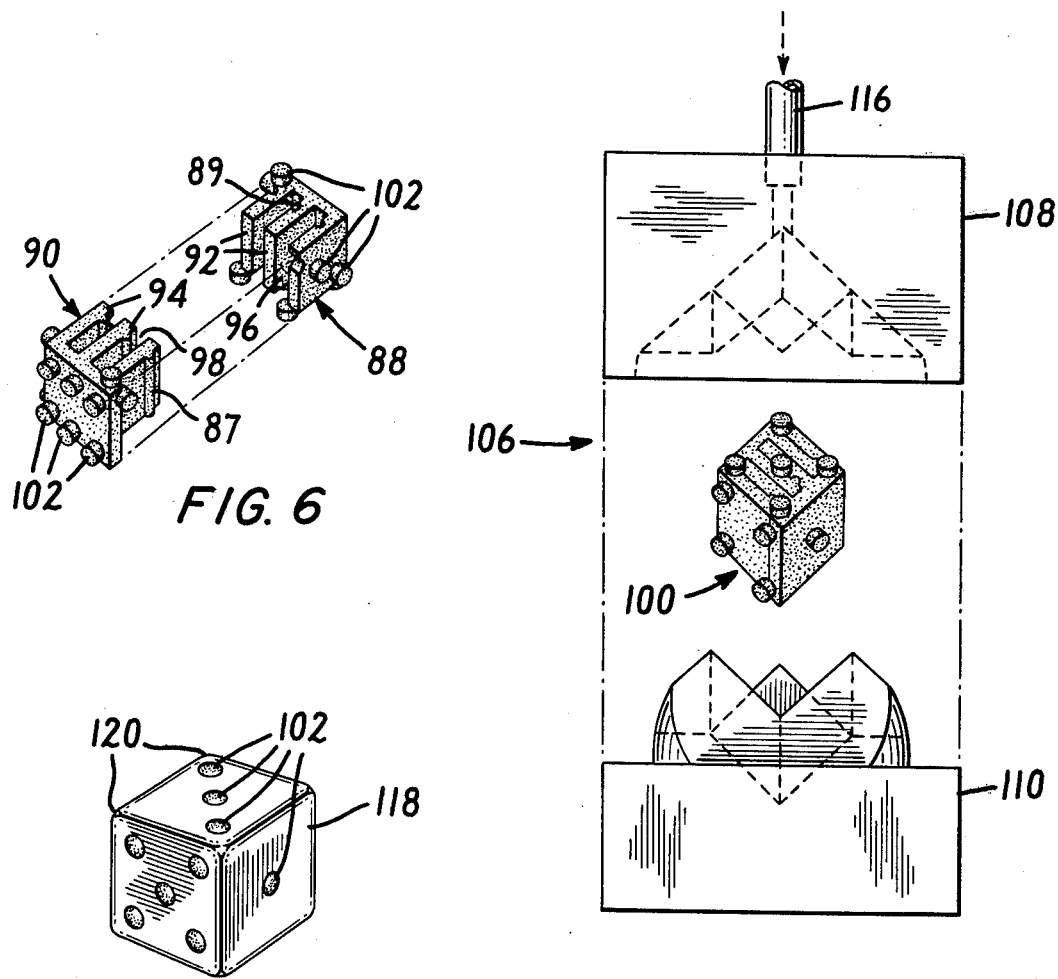
FIG. 6
FIG. 8
FIG. 7

METHOD FOR MOLDING COMPOSITE ARTICLES

FIELD OF INVENTION

This invention relates to a method for molding parts and more specifically, to a method for molding a composite plastic article.

DESCRIPTION OF THE PRIOR ART

There are presently many varied techniques employed for molding plastic parts. Injection molding is one example of a process typically employed. In this process, a mold having a cavity in the form of the article to be produced is selected, a molten plastic is then injected into the cavity, the plastic is cooled until it sets, and the formed article is formed from the mold. Of course, as in any commercial process, the time required to form an article by injection molding is quite significant in determining whether or not the process is sufficiently economical for the manufacture of certain products. One of the difficulties in such a process is that the thicker the object being formed, the longer is the time required to cool and set the object. Therefore, if it is desired to set up a fast running production line, usually only thin walled objects such as plastic bottles and the like may be economically produced with such a process. Yet there are many kinds of articles which are quite susceptible to being formed by injection molding procedures but because of the thickness of such articles, the process is not as useful as it could be. Items such as gaming dice, marjohng pieces, pool balls and the like require much time to be produced by molding techniques.

One possible solution to the problem of how to reduce process time for articles of this type is to form thin walled parts and join them together to complete by building up thin walled sections to form a cube and then coating the cube with the customary coating material. However, present apparatus and methods still prevent this approach from gaining commercial acceptance. The manufacture of a composite plastic object using presently available equipment is quite expensive and time consuming. For example, a mold having two sections forming a mold cavity in the shape of part of the article to be produced is filled with a molding material which is allowed to set. After the part has formed, one section of the mold is removed while the part remains in place and another or third section is moved into the original position of the first section. The third section has a second cavity which is configured to form the other part of the article. The second cavity is filled with plastic and the second part of the article is formed. In some manner, the second part is joined to the first part and a composite article results. This may be repeated with any number of mold sections to build up an article, but obviously it is a very time consuming and expensive process.

DESCRIPTION OF THE INVENTION

It is the primary object of this invention to provide a method which is capable of manufacturing composite articles quickly and economically by molding techniques.

It is another object of this invention to provide a method which molds several parts of an article simultaneously and then joins those parts to form a composite article.

It is still another object of this invention to provide a simple and economical method of forming gaming dice and other such objects.

Broadly, the apparatus comprises a novel mold or tool for producing a composite article. This mold includes two sections or mold halves which are adapted to join together in a closed position and to separate when the mold is open. When these sections are joined together they define a cavity which is divided into several chambers. Each chamber is intended to be used to form one element of the composite article. While these chambers are blocked from one another during the molding step so as to form individual elements, they are in communication with each other after the mold sections are separated. Since the newly formed elements have no obstacle between them when the mold is open, they may be joined together right in the mold. The elements are joined by a driving means which is operatively connected to a mold section and which, when actuated, drives one element into engagment with the other element to thereby form a unitary composite article. The article is then ejected or removed as a unitary piece.

The elements which are formed in the chambers may be joined in any desired manner when driven into engagement. Preferably, however, each element when molded is provided with a part which is adapted to mate with a complimentary part on another element. Typically, one element may have one or more projections while the corresponding element is provided with one or more mating grooves. To provide properly positioned mating parts, the apparatus is provided with an appropriately shaped forming means which extends into the chambers and is effective to define the mating parts so that when the molding material fills the chambers, the defined mating parts are formed. Thus if projections are to be formed on the elements, a plurality of spaced members extend from the mold section into the chamber and the spaces between adjacent members define the projections which are to be formed. In one embodiment, two substantially "E" shaped elements are in this manner formed in separate chambers and when driven together, the flags of the elements interlockingly engage to form a solid cube.

In many cases, it is desired that final composite article so formed have one or more portrusions extending outwardly from its surfaces. The apparatus may include for this purpose a number of depressions in the walls of the mold sections. These depressions are located at the place where the mold walls define the chambers so that when the chambers are filled with molding material, the depressions are also filled. Thus the protrusions are molded as an integral part of the element. In such a case, movement of the elements in the mold to join with each other is difficult since the protrusions which are formed on the surface of the element extend into the depressions in the walls. For the same reason, removal of the final article may also be difficult. To avoid this difficulty, one mold section is provided with adjustably positioned walls. That is, one or more of the walls of the mold section which retains the molded elements are movable toward or away from the chambers. By moving the walls away from the chambers, the protrusions are released from the depressions in these movable walls and the elements are free to move toward each other to a mating position. This also enables the final article to be easily ejected from the mold cavity. Ejection may be accomplished by one or more pins or other forcing means movably positioned in the mold section and effective to drive the article out of the cavity.

The method of the invention includes the steps of injecting a molding material into a mold apparatus having at least two chambers therein, filling the chambers with molding material to form molded elements, providing during the formation of such elements, a mating part on each of such elements, the mating part on one element being adapted to join with a mating part on another element, and after formation of the elements, driving one part into mating relationship with the other part thereby joining the elements to form a single composite article.

The method of the invention are particularly suited to the manufacture of gaming dice. For example, each chamber of the mold may be employed to form an E-shaped element which is driven into mating relationship with another E-shaped element to form a cube. During formation of the E-shaped elements, small protrusions representing the "numbers" on the faces of the die are formed by filling depressions in the walls of the mold. After the cube is ejected, it is coated with the conventional coating and a die is quickly formed. Any number of die cubes may be formed simultaneously in a plurality of mold sections and thus mass production of dice at a very low cost is achieved.

DESCRIPTION OF THE DRAWINGS

The above and other objects will become apparent from the following description taken in conjunction with the accompanying drawings, in which:

FIG. 5 is a side elevational view of FIGS. 3 and 4 illustrating the ejection of the composite article.

FIG. 6 is a perspective view of the molded elements prior to being joined together;

FIG. 7 is a front elevational view of a second mold apparatus useful in further processing of the composite article shown in FIG. 5; and FIG. 8 is a perspective view of the gaming die formed in the mold of FIG. 7.

Figure 1:
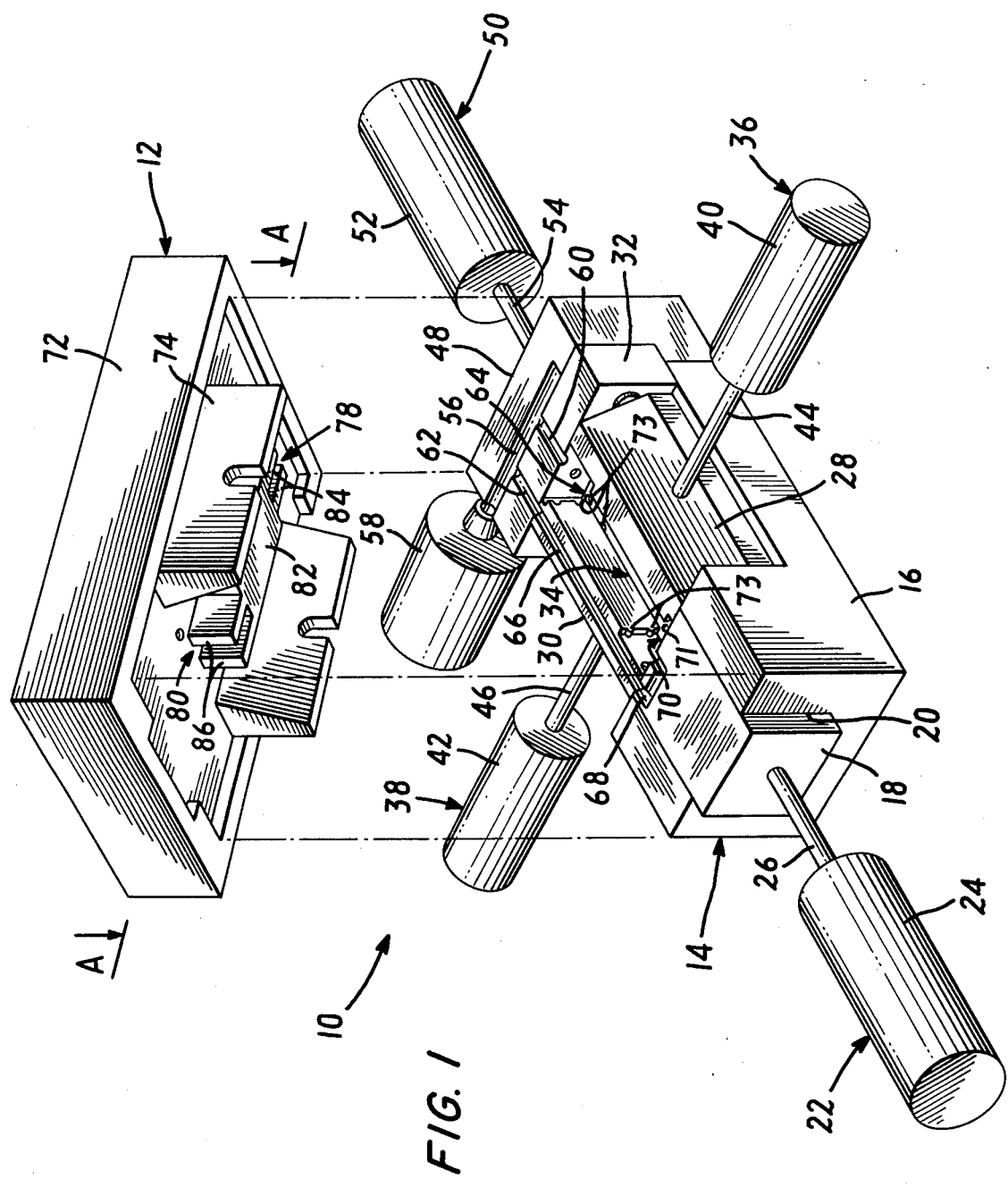
FIG. 1 is a perspective view of the apparatus showing the mold sections in an open position.

Referring now to the drawings and specifically FIG. 1, the apparatus will be described in a particular embodiment primarily adapted for the manufacture of dice, and more specifically, of a single game die. However, it will be readily appreciated by those skilled in the art that there are many other products which may be manufactured in accordance with the teachings of this invention.

In FIG. 1, a tool or mold apparatus is generally depicted by the numeral 10. The mold 10 comprises two sections 12 and 14. These sections 12 and 14 are shown in a separated position which is of course, the position of such sections when the mold 10 is open. When the mold 10 is closed, section 12 fits over section 14 in the form of a cover or lid, at least part of section 12 abutting against the upper surface of section 14 in the closed position.

Figure 2:
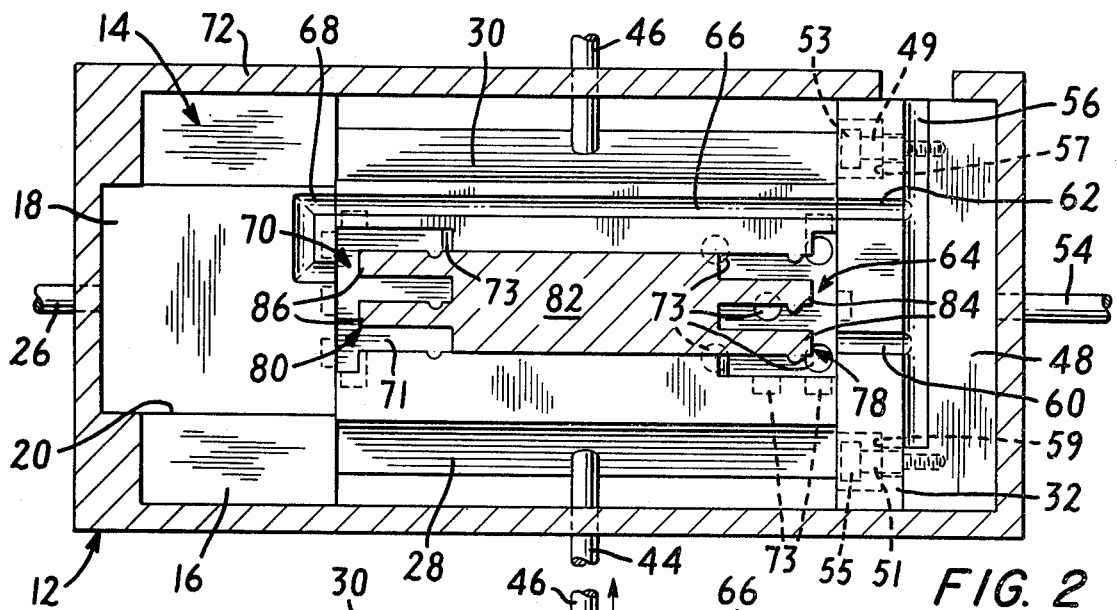
FIG. 2 is a cross sectional view taken on line A—A of FIG. 1 with the mold sections in a closed position.
Figure 3:
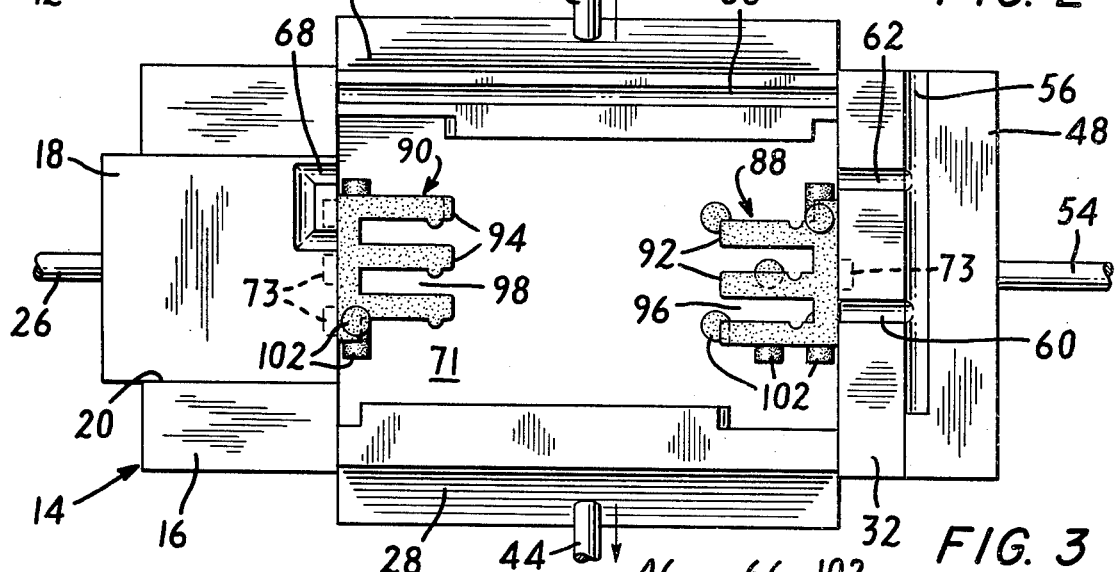
FIG. 3 is a plan view of the lower mold section of FIG. 1 after the upper mold section has been removed.

Section 14, which is the lower half of the mold 10 in the embodiment shown, includes a base 16 which provides the primary support for the structure. A block 18 is slidably mounted in opening 20 which is cut into base 16. A driving means 22 such as a hydraulic power system includes cylinder 24 and piston 26. The piston 26 is operatively connected to block 18 and drives the block forward into opening 20. Block 18 is also withdrawn by the driving means 22 when desired. Section 14 also includes a pair of side walls 28 and 30. These side walls, together with end wall 32 and block 18 define a cavity 34 within section 14. The side walls 28 and 30 are shown in a closed in position wherein they assist in forming cavity 34. However, these walls are movably positioned on base 16 and may be withdrawn to an open position such as illustrated in FIG. 3. For this purpose, power devices such as depicted by the numerals 36 and 38 move these walls forward toward cavity 34 or outwardly away from the cavity. Power devices 36 and 38 comprise cylinders 40 and 42 as well as pistons 44 and 46 respectively to achieve this result. End wall 32 which partially rests on base 16 and partially on end block 48, is attached to end block 48 such as by a pair of bolts 49 and 51 (FIG. 2) and is also movable once end block 48 is withdrawn. Withdrawal of block 48 is effected by yet another power device 50 which consists of cylinder 52 and piston 54, the latter being operatively connected to the block 48.

As shown in FIG. 1, block 48 has a channel 56 cut into the upper surface thereof. This channel receives molten plastic or other molding material from an injection supply source 58. End wall 32 is provided with transverse grooves 60 and 62 each of which communicates directly with channel 56. Groove 60 delivers the molten plastic from channel 56 directly into the end portion of cavity 34 which is generally indicated by the numeral 64. Groove 62, in conjunction with channel 66 in side wall 30 and groove 68 in block 18, all of which are directly connected, delivers the molten plastic to the other end portion of cavity 34 which is generally depicted by numeral 70. It will be noted that side wall 30, end wall 32 and bottom wall 71 include depressions 73 therein near end portion 64 of cavity 34. Similar depressions are provided in block 18, side wall 28 and side wall 30 near end portions 64 and 70 of cavity 34. These depressions are filled with plastic and form protrusions on the surface of any element which is molded in the end portions 64 and 70.

Figure 4:
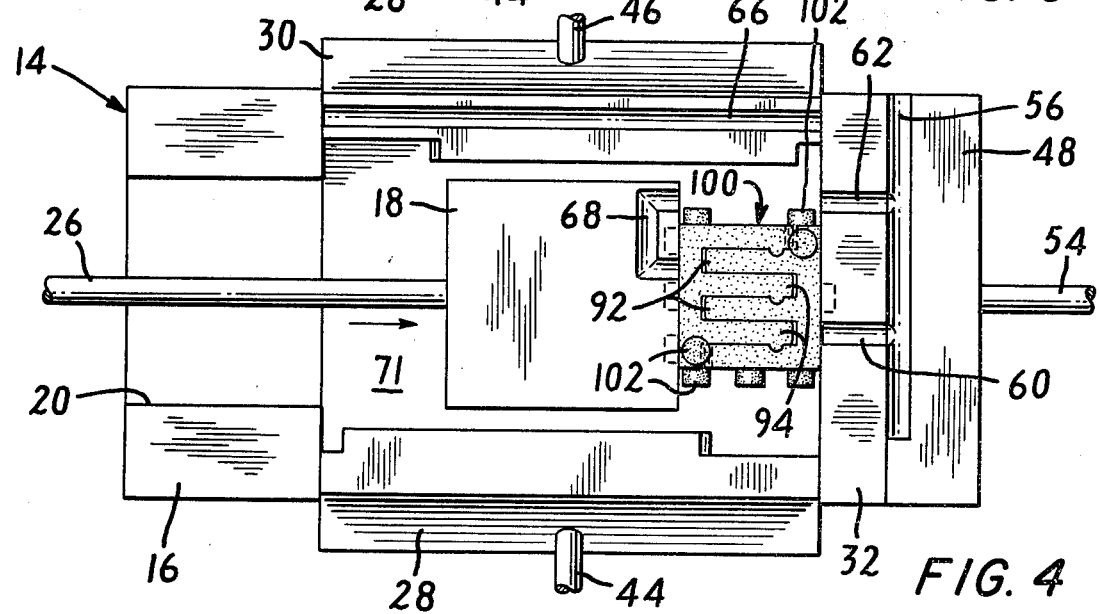
FIG. 4 is the plan view of FIG. 3 illustrating the molded elements driven into engagement with each other.

Referring now to section 12 which is the upper half of the mold apparatus 10, it is shown to include a support 72 from which inner partitions 74 and 76 depend. Operatively connected to the support 72 are two forming pieces 78 and 80 and a block 82. The forming pieces 78 and 80 include depending spaced members 84 and 86 respectively. These members extend down into end portions 64 and 70 of cavity 34 when the apparatus 10 is closed and define the shape of the elements to be molded at each end of cavity 34. As best shown in FIG. 2, these pieces 78 and 80 define a hollow E-shaped configuration which is filled with molding material during the molding process and thereby forms two solid E-shaped elements 88 and 90 (FIGS. 4 and 6). As also shown best in FIG. 2, the block 82 in section 12 extends into cavity 34 in section 14 when the mold is closed and separates end portion 64 from end portion 70. These two end portions are thus divided into separate chambers, each chamber housing an element. When the mold is opened and section 12 is again separated from section 14 after the molding step is complete, the cavity 34 is again unobstructed as best shown in FIG. 3.

Referring now to FIG. 3 which shows section 14 after section 12 has been removed, the E-shaped elements 88 and 90 which are formed after plastic material is injected into the mold and cooled, reside in the end portions 64 and 70 respectively of cavity 34. These elements are best shown in FIG. 6. Each element includes projecting E-bars 92 and 94 and spaces 96 and 98 between such E-Bars. The elements 88 and 90 are offset with respect to each other in cavity 34 so that E-bars 92 are in registration with spaces 98 and E-bars 94 are in registration with spaces 96. Thus when the two elements are brought together in cavity 34, the E-bars 92 interlock with E-bars 94 to form a single composite cubical article 100 (FIG. 5 and 7). As best shown in FIG. 6, the elements 88 and 90 include a number of protrusions 102 which are formed on the various surfaces of these elements. As explained previously, the protrusions 102 are formed integrally with the elements because depressions 73 in the mold walls (FIG. 1) are filled with molding material during the molding process. In the embodiment shown, these depressions represent the "numbers" on the face of a game die.

The interlocking of elements 88 and 90 is shown in FIG. 4. As illustrated in FIG. 4, side walls 28 and 30 have been withdrawn by power devices 36 and 38 respectively leaving enough space for block 18 to pass along cavity 34. Driving means 22 forces the block 18 along cavity 34 and block 18 carries element 90 toward element 88 until the two elements interlocking join together. The elements are united by engagement of ribs 87 into slits 89 (FIG. 6). In order to slide easily along bottom wall 71, element 90 is formed without any protrusions on its lowermost or "sliding" surface. The composite article 100 which is formed by elements 88 and 90 is then ejected from section 14 as shown in FIG. 5. This is accomplished by pins 104 which slidably move upwardly through base 16 into contact with article 100. These pins 104 may be driven by any suitable mechanical or hydraulic means (not shown). To accomplish this ejection, end block 48 is withdrawn by power device 50 and block 48 pulls bolts 49 and 51 which are threadably attached to this block. Bolt heads 53 and 55 slide in openings in end wall 32 until they engage walls 57 and 59 respectively. This causes end wall 32 to be drawn with block 48 and permits the article 100 to be free of any depression in end wall 32 and allows the ejection to freely occur.

Once the article 100 is ejected from section 14, it is brought to the shell mold 106 shown in FIG. 7. This mold 106 also has two sections 108 and 110. Each section is provided with cavity 112 and 114, each of which is designed to cover one half of the article 100 when sections 108 and 110 are joined together. Once article 100 is in the closed mold 106, a plastic material is injected through feed channel 116 and coats article 100 with an outer shell covering. After cooling, the mold 106 is opened and the gaming die 118 shown in FIG. 8 is removed. The gaming die 118 has rounded corners 120 which are formed in mold 106 due to the preformed shape of cavities 112 and 114.

From the foregoing, it will be appreciated that the present invention enables solid structures such as cubes, triangles, spheres and the like to be formed quickly and economically. This is accomplished by forming several thin walled elements simultaneously and then joining these elements to form a composite article. The thin-walled elements may be of any desired configuration and may have any number of mating parts on each such element which are adapted to mate with parts on any other element. The composite article which is formed may also be of any desired configuration depending upon the number, size and manner of joining the thin-walled elements. Moreover, any number of mold cavities may be used simultaneously to mass produce composite articles of the same type. Alternatively, a plurality of molds may be placed together to produce simultaneously or sequentially parts of a larger object, each mold producing one part to be used in assembling the larger object. Furthermore, any one mold may have a plurality of interconnected cavities, such as four cavities forming the four outer sides of a square or the like. In such a mold, a thin-walled element may be formed in each corner of the square and all four elements would be joined together in the mold by driving means. In this manner, a composite article consisting of more than two elements would be produced.

There are many other variations and modifications possible and they will become apparent to those skilled in the art. Driving means, means of forming chambers, ejection means and other mold apparatus parts may be altered without departing from the scope of this invention.

What is claimed is:

1. A method of forming a composite thick article from molded thin walled elements comprising the steps of injecting a molding material into a mold apparatus having at least two chambers with a separation therebetween, one of said chambers being in registration with the other said chambers, filling the chambers with said molding material to form a thin walled molded element in each of said chambers, providing during the formation of said elements, a plurality of projecting mating parts spaced from each other on each of said elements, the mating parts on one element extending outwardly toward and in registration with the mating parts on the other of said elements, removing the separation between said chambers to provide one chamber in unobstructed registration with the other of said chambers, while the elements are still in said chambers, driving said one element in substantially one direction toward said other element while still within said mold apparatus to join said mating parts thereby to form said composite article, and thereafter removing said composite article from said mold apparatus.

2. A method of forming a composite thick article from molded thin walled elements as described in claim 1 wherein said article is of a rectangular configuration, which steps include molding said thin walled elements with a plurality of projecting elements spaced from each other, maintaining said thin walled elements spaced from each other, maintaining said thin walled elements in said mold apparatus so that each of said projecting elements of one thin walled element is in registration and opposite the space formed by spaced pairs of projecting elements of the opposing thin walled elements, and bringing said thin walled elements together with each projecting element fitted within each said space formed by said spaced projecting elements and thus forming a single composite rectangular thick walled article in said mold apparatus.

3. A method as described in claim 2, wherein said composite thick article is rectangular and said thin walled elements are formed with spaced E-bars extending therefrom and forming said projecting elements and further including the steps of forming a plurality of protrusions on the surfaces of said thin walled elements while said thin walled elements are being formed by filling depressions in the walls of said chambers with molding material and moving said chamber walls having said depression away from said elements prior to driving said elements into interlocking relationship.

4. A method as described in claim 3, wherein said step of joining said mating parts thereby forms a composite thick cube article.

5. A method as described in claim 2, wherein said step of joining said mating parts thereby forms a composite thick triangular article and said thin walled elements are formed in the spaced E-bars extending therefrom and forming said projecting elements.

6. A method as described in claim 2, wherein said step of joining said mating parts thereby forms a composite thick sperical article and said thin walled elements are formed with spaced E-bars extending therefrom and forming said projecting elements.

7. In the method of claim 1, the steps of forming a plurality of protrusions on the surfaces of said elements in addition to said mating parts while said elements are being formed by filling depressions in the walls of said chambers with molding material and moving said chamber walls having said depressions away from said elements prior to driving said elements into interlocking relationship.

* * * * *